(12) United States Patent
Zhang

(10) Patent No.: US 11,440,269 B2
(45) Date of Patent: Sep. 13, 2022

(54) PROCESS OF MAKING A GLUTEN-BASED BIODEGRADABLE MATERIAL

(71) Applicant: Kurtis Zhang, York, PA (US)

(72) Inventor: Kurtis Zhang, York, PA (US)

( * ) Notice: Subject to any disclaimer, the term of this patent is extended or adjusted under 35 U.S.C. 154(b) by 284 days.

(21) Appl. No.: 16/932,734

(22) Filed: Jul. 18, 2020

(65) Prior Publication Data

US 2021/0283862 A1 Sep. 16, 2021

Related U.S. Application Data

(60) Provisional application No. 62/989,674, filed on Mar. 14, 2020.

(51) Int. Cl.
- *B29C 67/24* (2006.01)
- *C08L 89/00* (2006.01)
- *B29C 43/00* (2006.01)

(52) U.S. Cl.
CPC ............ *B29C 67/24* (2013.01); *B29C 43/003* (2013.01); *C08L 89/00* (2013.01); *B29K 2003/00* (2013.01); *B29K 2089/00* (2013.01); *B29K 2995/006* (2013.01); *B29K 2995/0056* (2013.01)

(58) Field of Classification Search
CPC ....... B29C 67/24; B29C 43/003; C08L 89/00; C08L 2205/16; B29K 2003/00; B29K 2089/00; B29K 2995/0056; B29K 2995/006; C08K 2003/265; C08K 3/26; C08K 3/346; C08H 1/00

See application file for complete search history.

(56) References Cited

U.S. PATENT DOCUMENTS

| | | | | |
|---|---|---|---|---|
| 3,653,925 A * | 4/1972 | Anker | ...................... | A23P 20/10 106/156.1 |
| 4,018,936 A * | 4/1977 | Garbutt | ...................... | A23J 3/18 426/430 |
| 4,179,525 A * | 12/1979 | Kleinschmidt | ........ | A21D 2/265 426/23 |
| 5,084,275 A * | 1/1992 | Maeda | ...................... | A61P 3/04 530/375 |
| 5,397,834 A * | 3/1995 | Jane | ......................... | C08B 31/00 525/54.31 |
| 5,470,382 A * | 11/1995 | Andou | .................... | B29C 67/24 106/125.1 |
| 5,472,511 A * | 12/1995 | Rayas | ..................... | A23P 20/20 530/424 |
| 5,605,577 A * | 2/1997 | Rayas | ..................... | A23P 20/20 530/424 |
| 5,610,277 A * | 3/1997 | Bassi | .................... | C07K 14/415 530/375 |
| 5,639,518 A * | 6/1997 | Ando | ....................... | B29C 35/12 427/591 |
| 5,665,152 A | 9/1997 | Bassi et al. | | |
| 5,747,648 A * | 5/1998 | Bassi | ...................... | A23P 20/20 426/656 |
| 6,045,868 A * | 4/2000 | Rayas | ................... | C09D 189/00 530/374 |
| 6,818,245 B1 * | 11/2004 | De Sadeleer | .......... | A23G 3/346 426/656 |
| 7,747,648 B1 | 6/2010 | Kraft et al. | | |
| 7,867,587 B2 | 1/2011 | Woerdeman et al. | | |
| 8,435,614 B2 * | 5/2013 | Woerdeman | ............ | C08L 89/00 264/129 |
| 10,073,340 B2 * | 9/2018 | Rotello | ................. | G03F 7/0002 |
| 11,104,497 B2 * | 8/2021 | Lee | ......................... | C08K 3/012 |
| 2004/0198956 A1 * | 10/2004 | Roels | ........................ | A23J 1/12 530/370 |
| 2005/0049400 A1 * | 3/2005 | Cheryan | .................. | C11B 3/008 530/373 |
| 2005/0287267 A1 * | 12/2005 | Maningat | ................... | A23J 1/12 426/549 |
| 2006/0042506 A1 | 3/2006 | Woerdeman et al. | | |
| 2007/0148384 A1 * | 6/2007 | Bowden | ............... | B65D 65/466 428/35.7 |
| 2008/0105998 A1 * | 5/2008 | Woerdeman | ............ | C08L 89/06 264/239 |
| 2008/0254200 A1 * | 10/2008 | Bassi | ........................ | A23J 3/18 530/375 |
| 2009/0041907 A1 * | 2/2009 | Etayo Garralda | ...... | C08L 89/00 426/240 |
| 2009/0136641 A1 * | 5/2009 | Azam | ....................... | A23J 1/12 426/515 |
| 2009/0202689 A1 * | 8/2009 | Peighambardoust | ..... | A23J 1/12 426/549 |
| 2010/0145019 A1 * | 6/2010 | Adachi | .................. | A23L 29/231 530/374 |
| 2011/0104355 A1 * | 5/2011 | Delporte | ............... | A23L 33/185 426/454 |
| 2012/0085262 A1 * | 4/2012 | Klimov | ................... | C08L 89/00 106/158.1 |
| 2012/0141609 A1 * | 6/2012 | Topolkaraev | ........ | C08K 5/0016 424/725 |
| 2013/0113138 A1 * | 5/2013 | Woerdeman | ........... | B27N 3/002 106/155.21 |
| 2015/0140191 A1 * | 5/2015 | Koot | ........................ | A21C 3/04 426/549 |
| 2015/0250204 A1 * | 9/2015 | Bassi | ........................ | A23J 3/18 530/375 |
| 2016/0309745 A1 * | 10/2016 | Spinelli | .................... | A23P 10/40 |
| 2016/0324207 A1 * | 11/2016 | Briganti | ................. | A23G 3/346 |
| 2016/0345609 A1 * | 12/2016 | Lorentsen | ............... | C12P 19/02 |
| 2017/0150729 A1 * | 6/2017 | Okazaki | .................... | A21D 8/06 |
| 2017/0298337 A1 * | 10/2017 | Kale | ........................ | B01D 11/02 |
| 2018/0044858 A1 * | 2/2018 | Peralba | .................. | D21H 19/54 |

(Continued)

*Primary Examiner* — Kevin R Kruer

(57) ABSTRACT

The present invention is directed to a fully biodegradable material based on a plant protein. The present invention is also directed to a process method of making a gluten-based biodegradable material by a water induced flocculation step. A fully hydrated gluten dough with or without an additive or/and a filler formed from the flocculation step, which has low viscoelasticity, is further molded into an article with desired shapes under a low shear stress in a relatively low temperature range. A rigid or flexible biodegradable plastic article is obtained by removing extra water at a temperature lower than decomposition temperature of the gluten.

18 Claims, No Drawings

(56) References Cited

U.S. PATENT DOCUMENTS

| | | | |
|---|---|---|---|
| 2018/0070624 A1* | 3/2018 | Palmer | A23J 1/20 |
| 2018/0296343 A1* | 10/2018 | Wei | B29C 64/241 |
| 2018/0334777 A1* | 11/2018 | Thole | D21B 1/12 |
| 2018/0352778 A1* | 12/2018 | Kang | A23L 7/10 |
| 2019/0059330 A1* | 2/2019 | Torney | A23K 20/163 |
| 2019/0380519 A1* | 12/2019 | Bhagat | A47G 19/00 |
| 2020/0071366 A1* | 3/2020 | Hirose | C07K 14/415 |
| 2020/0094446 A1* | 3/2020 | Sato | C08K 5/5205 |
| 2020/0113193 A1* | 4/2020 | Kong | A47G 21/04 |
| 2020/0281223 A1* | 9/2020 | Tanner | A23J 1/12 |
| 2021/0007388 A1* | 1/2021 | Wang | A23L 7/10 |
| 2021/0283862 A1* | 9/2021 | Zhang | B29C 43/003 |
| 2022/0002690 A1* | 1/2022 | Lavigne | A23J 1/12 |
| 2022/0046975 A1* | 2/2022 | Skulec | A23L 25/30 |
| 2022/0087286 A1* | 3/2022 | Henderson, Jr. | C07K 1/145 |
| 2022/0125228 A1* | 4/2022 | Fagioli | B26B 25/005 |
| 2022/0125996 A1* | 4/2022 | Camci-Unal | A61P 19/08 |

* cited by examiner

PROCESS OF MAKING A GLUTEN-BASED BIODEGRADABLE MATERIAL

RELATED APPLICATIONS

This application claims the benefit of provisional patent application No. 62/989,674, filed on Mar. 3, 2020. The entire contents of the priority application is incorporated herein by reference.

FIELD OF INVENTION

The present invention is directed to a fully biodegradable material, in particular, a biodegradable material based on inexpensive and abundant plant protein wheat gluten (WG). The present invention is also directed to a process of making wheat gluten based materials by a water-induced flocculation step of wheat gluten dispersed in a hydrophilic organic solvent or in a mixture of the hydrophilic organic solvent with water.

BACKGROUND OF THE INVENTION

Petroleum-based synthetic plastic pollution is a major global problem today. The synthetic plastics take a long period of time to decompose, and some of them never completely break down, which means that billions of tons of plastic dumped on the earth might get broken down into microscopically small pieces. These tiny plastic particles are harmful to the environment especially to the fresh water sources and freshwater ecosystem. In fact, plastic particles have been found in almost all the water sources. To address this big problem on our planet, considerable efforts have been made to develop biobased materials, especially from renewable resources such as agricultural byproducts and other biomass. The biobased materials generally degrade in a relatively short period of time in the normal environment by action of microorganisms.

There are many advantages of biobased materials such as renewable, sustainable, fossil resources saving and environmental impact reduction.

Wheat gluten (WG) is a plant protein from wheat, which is an inexpensive and abundant raw material derived from renewable resources and is biodegradable. This protein is a co-product from gluten-starch separation or bioethanol product, and about 100 million pounds of wheat gluten are produced in the USA every year with a selling price of around $0.50 to $0.80 per pound, lower than those of common synthetic thermoplastic materials such as polyethylene (around $0.80 per pound) and polystyrene (around $1 per pound). It has been reported that the wheat gluten can fully biodegrade after 36 days in aerobic fermentation and within 50 days in farmland soil without releasing toxic products, which makes it an ideal candidate for development of biodegradable materials.

Traditionally, two technological processing approaches can be used to make materials based on gluten proteins including a wet processing approach and a dry processing approach. Wet process generally leads to a film or a flat sheet formation, and dry process (commonly known as thermal process such as extrusion, injection or thermo-compression molding) generally leads to a plastic article with different shapes.

WG-based films have been obtained by casting and drying of gluten/solvent dispersion. The solvent used to prepare gluten film-forming dispersion is generally a mixture of water and alcohol or occasionally acetone. Dispersing wheat gluten proteins in a solvent may also require adding disruptive agents such as mercapto-ethanol, urea, sodium sulfite, sodium dodecyl sulfate or dithiothreitol (DTT), adjusting pH, or controlling ionic strength to make more glutenin subunits available to interact with other gluten protein molecules. The film formation by solvent removal is due to increasing polymer concentration in the medium, which leads to polymer chain interpenetration and three-dimensional network formation. With a proper sovent system, casting of gluten probably leads to a network structure with numerous hydrogen bonds formed between protein chains, plus high crosslinking potential from —SH/S—S reaction, which forms a low flexibility of unplasticized gluten film. The polarity of the solvent need to be adjusted to sufficiently dissolve and/or expand protein molecular chains (dissolve sub-unit of crosslinked protein) in order to form a interpenetrated three dimensional network, otherwise, instead of forming a continuous polymer film, a powdery or a fragile product is formed after solvent removal. In order to increase flexibility and overcome the brittleness of the film, a polar plasticizing agent can be added to break extensive intermolecular forces generated by hydrogen bonds, which increases mobility of the molecular chain.

WG-based plastic articles can also be made with a dry process (thermal process) based on thermoplastic properties of gluten proteins under some specific conditions. Generally, plastic materials can be shaped into desired forms by one of the plastics thermal process methods including thermo-compression molding, injection molding, extrusion (forms films and fibers, coating and lamination). However, plant proteins such as soy protein and WG have low decomposition temperature (start decomposing around 130° C.), which is much lower than their thermal processing temperature, and thus makes these proteins facing a big challenge being processed by a thermal process. In order to make the thermal process possible, at least one of plasticizers is added to WG to modify the three-dimensional organization, decreases attractive intermolecular forces, and increases chain mobility of the gluten proteins, and makes WG processable in a limited window of operating conditions which occurs at rather low temperatures when compared to most of synthetic polymers to prevent thermal decomposition of WG. Gluten materials are thus generally dry processed between 80 and 130° C. by adding plasticizers. The drawback of this method is that a large amount of plasticizer needs to be used to sufficiently reduce processing temperature which typically obtains a final product having low mechanical performance with high cost. High mechanical shear stress applied to the mixture of gluten-based materials having plasticizer during mixing or extrusion, might also reduce the molecular weight (mechanically induced degradation), which may negatively affect the final mechanical properties.

The objective of this invention is to make a fully biodegradable material, in particular, a biodegradable composite based on inexpensive and abundant plant protein WG. In order to overcome the disadvantages of the traditional solvent casting method and thermal process method, another objective of this invention is to develop a new process method of making WG-based materials by water-induced flocculation of WG in a dispersion with a hydrophilic organic solvent or a mixture of hydrophilic organic solvent and water as a medium.

SUMMARY OF THE INVENTION

The present invention is directed to a fully biodegradable material, in particular, a biodegradable material based on inexpensive and abundant plant protein gluten, specifically wheat gluten (WG), and a filler, wherein the filler include organic biomass-based particles or fibers, or inorganic particles or fibers. The present invention is also directed to a process method of making the gluten-based material, which can be further molded into an article of a desired shape in a low temperature range. Specifically, this invention provides a new process method of making a gluten-based fully biodegradable material including a step of water induced flocculation, which obtains a fully hydrated and low elastic gluten-based material with low viscoelasticity; a step of molding the hydrated material into an article with a desired shape by a low shear stress at a temperature range of 5° C. to 40° C.; and a step of drying the molded article at a temperature lower than the decomposition temperature of the gluten, generally lower than 130° C., in order to keep primary structure of gluten protein. In another embodiment, the process method further includes a drying step with a high drying temperature range of 150° C. to 350° C., which generates intermolecular crosslinking between protein chains in order to improve water resistance of the molded articles of gluten-based materials. This process method is capable of being scaled-up, and the gluten-based materials made from this process have potential applications in fertilizer control-release, food packaging, shipping packaging, toy making, plant container and other commercial products.

DETAILED DESCRIPTION OF THE PREFERRED EMBODIMENTS

In the present invention, a process method of making a plant protein WG-based material comprising a water induced flocculation step is presented. Generally, this invention provides a new process of making a gluten-based fully biodegradable material and a molded article including following steps: (1) add a commercially available WG powder with or without a filler into a hydrophilic solvent preferably a water miscible solvent, or a mixture of water and a water miscible organic solvent having a concentration at least 80% by volume to form an even WG dispersion; (2) add water into the WG dispersion from previous step (1) to decease the organic solvent concentration to less than 75% by volume of the water/solvent mixture, stir the dispersion for at least 1 minute to allow the wheat gluten or wheat gluten/filler well dispersed and forms a viscous dispersion; (3) add more water to the dispersion from previous step (2) to decrease organic solvent concentration to less than 20% by volume of the water/solvent mixture, stir the dispersion until all gluten or gluten/filler precipitate out; (4) collect the flocculent (precipitates) by filtration to remove the supernatant and obtain a fully hydrated dough (5) add a plastic additive by kneading the dough at room temperature until the additive being completely absorbed; (6) mold the dough into desired shape to form an article; (7) dry the hydrated article at a preset temperature for a preset period of time to fix the article into a rigid or flexible final product.

The wheat gluten (WG) used for the present invention is in any form of wheat gluten which can be dispersed in a liquid such as an organic solvent or a solvent mixture, preferably a commercially available WG powder. Preferably, the WG powder comprises at least 60% by weight of gluten protein, more preferably, the WG powder comprises at least 70% by weight of gluten protein, and the most preferably the WG powder comprises at least 80% by weight of gluten protein. Typically, the WG powder comprises about 75% by weight of gluten protein, about 10% by weight starch, about 10% by weight moisture, about 5% by weight lipids, and about less than 1% by weight minerals. Alternatively, commercial WG powder purified by protein fractionation or extraction can also be used.

The filler can be either an organic filler or inorganic filler. The preferred organic filler is powder or small particle made from a biomass such as spent coffee grounds, saw dust, pulverized peanut shell, pulverized tree-nut shell; or a short fiber from wood or non-wood plants such as a straw fiber from corn, wheat, or rice; hemp fiber; grass fiber; wool fiber; cellulose fiber; cotton fiber; or a mixture thereof. Synthetic plastic particles or synthetic fibers, preferably biodegradable synthetic plastic particles and fiber, may also be used in order to render a composite having desired properties or functions. Inorganic filler is a micron-size or nano-size particle which includes a metal oxide such as silicon oxide, titanium oxide, alumina, magnesium oxide, zinc oxide and the like; mineral particle such as calcium carbonate, talc, mca, kaolin clay, gypsum, wollastonite and the like; and a carbon-based material such as carbon black, graphie, carbon nanotube, carbon nanofiber, graphene, graphene oxide. Short glass fiber and other inorganic fiber with or without surface treatment can also be used as a reinforcing filler to improve mechanical properties of the material. The filler content in the WG-based material in this invention is in range of 5 to 85%, preferably 15 to 75%, more preferably 25 to 65%, furthermore preferably 30 to 50%, by weight with respect to total composition by weight.

Organic solvent is a hydrophilic or water miscible solvent selected from low molecular weight alcohol or ketone such as methanol, ethanol, propanol, isopropanol, butanol, isobutanol, acetone, methyl ethyl ketone and the like. Preferably, environmental benign or VOC exempt solvent such as isopropanol and acetone are used in the preparation of WG dispersion.

Water is a purified water in a preferred pH range of 5.0 to 9.0, more preferably pH of 6.0 to 8.0, and most preferably pH of 6.5 to 7.5. Water is added to adjust the polarity of the solvent/water mixture to enhance dissolution or expansion of gluten protein. Particularly, proper polarity of the solvent/water mixture makes it possible to dissolve gliadin, one of major proteins in the wheat gluten, which leads to the viscosity of gluten dispersion significantly increasing. Viscosity of the dispersion can be adjusted by water amount being added in the dispersion, proper viscosity is critical to maintain the filler being evenly dispersed in the dispersion without settling down to bottom of the container during the stirring in the process step (2) as set forth above, wherein higher viscosity is generally needed to keep inorganic filler being evenly dispersed, because organic fillers has higher density of the solvent/water mixture. The stirring time in the process step (2) is preferably at least 1 minute, more preferably at least 2 minutes, most preferably at least 3 minutes, which can be adjusted upon batch size of the dispersion.

In the flocculation step (3), a large amount of water is added to adjust organic solvent concentration to 20% or lower by volume of the solvent/water mixture. In this step, low speed stirring is applied to the dispersion until all the dispersed particles precipitate or co-precipitate out. The flocculent (precipitate) is collected as a hydrated dough after removing supernatant, the hydrated dough has low viscoelasticity which is readily molded into a desired shape to form an article. The flocculent can also be collected by filtration or centrifugation, when precipitates do not form a cohesive dough, which can be further kneaded into a dough with or without adding plastic additives. In another embodiment, the step (3) may directly follow step (1) as described above instead of following step (2), to obtain a fully hydrated WG-based material from step (1).

One or more plastic additives are added when they are desired in the kneading step (4). In particular, one or more common plastic additives include a crosslinker, a plasticizer, a antimicrobial agent, a fungicide, an antioxidant, a pigment, a light fasting agent or a mixture thereof can be used to render the material have desired properties or functions with respect to their specific applications. Crosslinkers include but are not limited to a low toxic difunctional aldehyde, glutaraldehyde, ascorbic acid, polythiols or a mixture thereof. A small amount of environmental benign hydrophilic polymer such as polyvinyl alcohol, polyacrylic acid, polyvinyl pyrrolidone and their copolymers can be used to adjust the viscoelasticity of hydrated dough and mechanical properties of the final products. A plasticizer is used to adjust stiffness and flexibility of the product, wherein the content of the plasticizer depends upon the flexibility as needed, which is generally in a range of 5 to 40% by weight. The contents of other additives are generally in a range of 0.1 to 10% by weight as commonly used in the art.

The dough collected from previous steps is formed into a desired shape by a further molding step. The dough with low elasticity is formed into shaped articles by a common process known in the plastic processing field. For example, flat sheets can be obtained by pressing the dough into desired thickness, and other three-dimensionally shaped articles can be formed by using a die in a plastic forming processes such as extrusion, injection and compression molding. The temperature of the molding step is preferably in a range of 5° C. to 50° C., more preferably 15° C. to 40° C., furthermore preferably 20° C. to 30° C.; with respect to the low viscoelasticity of the hydrated dough.

The hydrated shaped article formed from the previous molding step must be further dried in order to achieve desired mechanical properties and other functions of the article. Regardless of the forming process used, once the dough is molded into a desired shape, the hydrated shaped article is placed into a drying environment to remove water and solvent residue from the shaped article, preferably at a relatively low temperature range in which the primary structure of the wheat gluten protein can be kept. The drying environment is achieved by either controlling the temperature, the humidity, or both the temperature and the humidity, which permits the escape of water molecules from the both interior and exterior of the shaped article. Preferably, the drying environment has a temperature lower than the decomposition temperature of the gluten, generally lower than 130° C., preferably in a range of 60° C. to 120° C., more preferably in a range of 70° C. to 110° C., and most preferably in a range of 80° C. to 100° C., in order to keep the primary structure of gluten protein. In some instances, the drying environment may also have a forced air that aids in the drying process. Alternatively, a very low humidity environment having a temperature less than about 60° C. is also suitable for the present invention. In another embodiment, the process may include a drying step with an elevated drying temperature range of 130° C. to 350° C., wherein thermal induced crosslinking among gluten protein molecules and active groups on the surface of the filler may occur to improve water resistance of the molded articles.

A preferred embodiment for making the solid biodegradable articles of the present invention involves compression molding. In this process, the cohesive, low elastic dough is positioned in a flat substrate at room temperature in a range of 10° C. to 30° C. The dough is compressed in the mold to form a flat sheet with a thickness about % inches, which is placed in a drying environment having a temperature at 60° C. to 100° C. with a force air at least 4 hours to render a solid strong plastic sheet. The solid biodegradable articles of the present invention are completely biodegradable and achieve good mechanical properties at a drying temperature lower than its decomposition temperature.

A hydrophobic coating layer or a film is applied or laminated to the surface of the dried gluten-based biodegradable articles to improve water moisture resistance of the article. The hydrophobic coating layers can be applied onto the surface of the article by either spraying coating process or dip-coat process. Environmental benign materials such as silicone materials are preferred coating bases of the hydrophobic coating. Crosslinking of the gluten protein at a relatively high temperature is another method to improve water moisture resistance of the gluten-based materials, wherein the protein molecular chains are subjected to crosslink with or without using a crosslinking agent. The crosslinking temperature is preferably in a range of 150° C. to 450° C., more preferably 200° C. to 400° C.

EXAMPLES

Materials: Spent coffee grounds (SCG) are collected and dried at room temperature for 4 to 6 weeks, and then conditioned at temperature around 15° C. to 25° C., relative humidity around 45 to 50% for at least two weeks before use. All other materials including vital wheat gluten (WG, Medley Hills Farm), calcium carbonate, clay, distilled water and Isopropyl alcohol (IPA 91% (v/v)) are commercially available.

Example 1. A Wheat Gluten Plastic Article is Prepared by Following Steps

In 20 grams IPA (91%), add 10 grams WG, stir to make the WG evenly dispersed in the IPA. Add 40 grams of distilled water, stir the mixture around 3 to 5 minutes and let the mixture turn into a viscous dispersion. Add 80 to 120 grams of distilled water, keep stirring until all the WG precipitates out. A fully hydrated WG dough with low elasticity is obtained by collecting the flocculent (precipitates) and removing supernatant by filtration. Plastic additives such as plasticizers, anti-bacterial agents, and antioxidants can be added in this step by kneading the additives into the dough. Mold the hydrated WG dough into a desired shape of a plastic object. Transfer the molded object into an oven with pre-setted drying temperature and drying time to obtain a dried object.

Example 2. A Wheat Glute/Coffee Grounds Composite Article is Prepared by Following Steps In 20 grams IPA (91%), add 10 grams WG and 5 grams dried spent coffee grounds, stir to make the WG and the coffee grounds evenly dispersed in the IPA. Add 40 grams of distilled water, stir the mixture around 3 to 5 minutes and let the mixture turn into a viscous dispersion. Add 80 to 120 grams of distilled water, keep stirring until all the WG and the coffee grounds precipitate out. A fully hydrated WG/coffee grounds dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object.

Transfer the molded object into an oven with pre-setted drying temperature and drying time to obtain a dried object.

Example 3. A Wheat Glute/Coffee Grounds Composite Article is Prepared by Following Steps In 20 grams IPA (91%), add 10 grams WG and 10 grams dried spent coffee grounds, stir to make the WG and the coffee grounds evenly dispersed in the IPA. Add 40 grams of distilled water, stir the mixture around 3 to 5 minutes and let the mixture turn into a viscous dispersion. Add 80 to 120 grams of distilled water, keep stirring until all the WG and the coffee grounds precipitate out. A fully hydrated WG/coffee grounds dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 4. A Wheat Glute/Coffee Grounds Composite Article is Prepared by Following Steps In 20 grams IPA (91%), add 10 grams WG and 15 grams dried spent coffee grounds, stir to make the WG and the coffee grounds evenly dispersed in the IPA. Add 40 grams of distilled water, stir the mixture around 3 to 5 minutes and let the mixture turn into a viscous dispersion. Add 80 to 120 grams of distilled water, keep stirring until all the WG and the coffee grounds precipitate out. A fully hydrated WG/coffee grounds dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 5. A Wheat Gluten/Calcium Carbonate Composite Article is Prepared by Following Steps In 20 grams IPA (91%), add 10 grams WG and 5 grams calcium carbonate powder, stir to make the WG and the calcium carbonate particles evenly dispersed in the IPA. Add 40 grams of distilled water, stir the mixture around 3 to 5 minutes and let the mixture turn into a viscous dispersion. Add 80 to 120 grams of distilled water, keep stirring until all the WG and calcium carbonate particles precipitate out. A fully hydrated WG/calcium carbonate dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 6. A Wheat Gluten/Calcium Carbonate Composite Article is Prepared by Following Steps In 20 grams IPA (91%), add 10 grams WG and 10 grams calcium carbonate powder, stir to make the WG and the calcium carbonate particles evenly dispersed in the IPA. Add 40 grams of distilled water, stir the mixture around 3 to 5 minutes and let the mixture turn into a viscous dispersion. Add 80 to 120 grams of distilled water, keep stirring until all the WG and calcium carbonate particles precipitate out. A fully hydrated WG/calcium carbonate dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 7. A Wheat Gluten/Calcium Carbonate Composite Article is Prepared by Following Steps In 20 grams IPA (91%), add 10 grams WG and 15 grams calcium carbonate powder, stir to make the WG and the calcium carbonate particles evenly dispersed in the IPA. Add 40 grams of distilled water, stir the mixture around 3 to 5 minutes and let the mixture turn into a viscous dispersion. Add 80 to 120 grams of distilled water, keep stirring until all the WG and calcium carbonate particles precipitate out. A fully hydrated WG/calcium carbonate dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 8. A Wheat Gluten/Clay Composite Article is Prepared by Following Steps In 20 grams IPA (91%), add 10 grams WG and 10 grams clay powder, stir to make the WG and the clay particles evenly dispersed in the IPA. Add 40 grams of distilled water, stir the mixture around 3 to 5 minutes and let the mixture turn into a viscous dispersion. Add 80 to 120 grams of distilled water, keep stirring until all the WG and clay particles precipitate out. A fully hydrated WG/clay dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 9. A Wheat Gluten/Glass Fiber Composite Article is Prepared by Following Steps In 20 grams IPA (91%), add 10 grams WG and 5 grams short glass fiber powder, stir to make the WG and glass fiber evenly dispersed in the IPA. Add 40 grams of distilled water, stir the mixture around 3 to 5 minutes and let the mixture turn into a viscous dispersion. Add 80 to 120 grams of distilled water, keep stirring until all the WG and the glass fiber precipitate out. A fully hydrated WG/coffee grounds dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 10. A Wheat Gluten Plastic Article is Prepared by Following Steps

In 20 grams IPA (91%), add 10 grams WG, stir to make WG evenly dispersed in the IPA. Add 120 to 160 grams of distilled water, keep stirring until all the WG precipitates out. A fully hydrated WG dough with low elasticity is obtained by collecting the precipitates and removing supernatant by filtration. Plastic additives such as plasticizers, anti-bacterial agents, and antioxidants can be added in this step by kneading the additives into the dough. Mold the hydrated WG dough into a desired shape of a plastic object. Transfer the molded object into an oven with pre-setted drying temperature and drying time to obtain a dried object.

Example 11. A Wheat Glute/Coffee Grounds Composite Article is Prepared by Following Steps In 20 grams IPA (91%), add 10 grams WG and 10 grams dried spent coffee grounds, stir to make the WG and the coffee grounds evenly dispersed in the IPA. Add 120 to 160 grams of distilled water, keep stirring until all WG and coffee grounds precipitate out. A fully hydrated WG/coffee grounds dough with low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Example 12. A Wheat Gluten/Calcium Carbonate Composite Article is Prepared by Following Steps In 20 grams IPA (91%), add 10 grams WG and 10 grams calcium carbonate powder, stir to make the WG and calcium carbonate particles evenly dispersed in the IPA. Add 120 to 140 grams of distilled water, keep stirring until all WG and the calcium carbonate particles precipitate out. A fully hydrated WG/calcium carbonate dough with a low elasticity is obtained by collecting the precipitates and removing supernatant by filtration. Plastic additives such as plasticizers, anti-bacterial agents, and antioxidants can be added in this step by kneading the additives into the dough. Mold the hydrated composite dough into a desired shape of a plastic object. Transfer the molded object into an oven with pre-setted drying temperature and drying time to obtain a dried object.

Comparative Example 1. A Wheat Gluten Sheet is Prepared by Following Steps

In 20 grams IPA (91%), add 10 grams WG, stir to make the WG evenly dispersed in the IPA. Add 40 grams of distilled water, stir the mixture around 3 to 5 minutes and let the mixture turn into a viscous dispersion. Transfer the viscous dispersion into a container with a flat surface, and then keep the dispersion in the container for around 3 to 5 hours to get rid of bubbles trapped in the dispersion during the stirring. Transfer the container into an oven with pre-setted drying temperature and drying time to obtain a cast product.

Comparative Example 2. A Wheat Gluten/Coffee Grounds Sheet is Prepared by Following Steps In 20 grams IPA (91%), add 10 grams WG and 10 grams spent coffee grounds, stir to make the WG and the coffee grounds evenly dispersed in the IPA. Add 40 grams of distilled water, stir the mixture around 3 to 5 minutes and let the mixture turn into a viscous dispersion. Transfer the viscous dispersion into a container with a flat surface, and then keep the dispersion in the container for around 3 to 5 hours to get rid of bubbles trapped in the dispersion during the stirring. Transfer the container into an oven with pre-setted drying temperature and drying time to obtain a cast product.

In the present inventive examples, the articles of WG and WG/filler composite formed from the present process with a flocculation step are tough and all gluten particles are fused together to form a plastic-like continuous phase. In the WG/filler composite, all filler particles or fibers are evenly dispersed and adhered to the gluten phase, wherein the gluten proteins function as a cohesive polymer matrix. The toughness and flexibility of the product can be well balanced by adding a certain amount of plasticizer. In the comparative examples, the WG and WG/filler composite formed from solvent casting are fragile with only small amount of the gluten particles being fused together, and the filler particles are loosely packed together with gluten particles, the gluten proteins do not form a cohesive continuous plastic phase to function as a polymer matrix.

The invention claimed is:

1. A process for making a gluten-based plastic article comprising, mixing gluten powder with a hydrophilic organic solvent to form a dispersion; adding water to the dispersion to adjust concentration of the hydrophilic organic solvent to less than 20% by volume with respect to total volume of a medium including the hydrophilic solvent and water, stirring the dispersion to form a flocculent comprising a hydrated gluten; collecting the flocculent by removing the supernatant to obtain a hydrated gluten dough; casting or molding the hydrated gluten dough into a desired shape; and drying the cast or molded shape at a preset temperature for a preset period of time to fix the cast or molded shape into a plastic product.

2. The process according to claim 1, further comprising a step of adding water into the dispersion to adjust the solubility of the gluten in the medium, wherein the water content is in a range of 35% to 75% by volume with respect to total volume of the medium.

3. The process according to claim 1, further comprising a step of kneading a plastic additive into the hydrated glute dough.

4. The process according to claim 1, further comprising a step of coating the gluten-based plastic article with a hydrophobic coating.

5. The process according to claim 1, further comprising a step of crosslinking the gluten based plastic article at a temperature range of 200° C. to 400° C.

6. The process according to claim 1, wherein the gluten powder is a wheat gluten powder comprising at least 60% by weight of gluten protein.

7. The process according to claim 1, wherein the organic solvent is a hydrophilic or water miscible solvent including a low molecular weight alcohol or a ketone.

8. The process according to claim 1, wherein the water has a pH range of 6.0 to 8.0.

9. The process according to claim 1, wherein the collecting step comprises a free-settling step, a filtration step or a centrifugation step.

10. The process according to claim 1, wherein the molding step includes an extrusion molding step, an injection molding step or a compression molding step.

11. The process according to claim 1, wherein the molding step comprises a molding temperature in a range of 5° C. to 40° C.

12. The process according to claim 1, wherein the drying step comprises a drying temperature in a range of 60° C. to 130° C.

13. The process according to claim 1, further comprising a step of adding a filler into the dispersion before formation of the flocculent.

14. The process according to claim 13, wherein the filler is an organic filler or an inorganic filler.

15. The process according to claim 14, wherein the organic filler is a pulverized biomass particle including spent coffee ground, saw dust, pulverized peanut shell, pulverized tree-nut shell, or a short fiber of wood or non-wood plants.

16. The process according to claim 14, wherein the inorganic filler is micron-size or nano-size particles including a metal oxide, a mineral particle, a carbon-based material, or a short glass fiber.

17. The process according to claim 14, wherein the filler content is in range of 5 to 85% by weight with respect to total composition.

18. The process according to claim 3, wherein the plastic additive comprises a crosslinker, a plasticizer, an antimicrobial agent, a fungicide, an antioxidant, a pigment, a light fasting agent, or a mixture thereof.

* * * * *